US011419338B2

(12) United States Patent
Kido et al.

(10) Patent No.: US 11,419,338 B2
(45) Date of Patent: Aug. 23, 2022

(54) CARTILAGE CUTTING DEVICE AND CARTILAGE CUTTING METHOD FOR BONE-IN MEAT

(71) Applicant: MAYEKAWA MFG. CO., LTD., Tokyo (JP)

(72) Inventors: Koji Kido, Tokyo (JP); Naoki Toyoda, Tokyo (JP); Hiroyuki Sakurayama, Tokyo (JP); Akira Koizumi, Tokyo (JP); Moemi Kato, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 568 days.

(21) Appl. No.: 16/603,684

(22) PCT Filed: Dec. 19, 2018

(86) PCT No.: PCT/JP2018/046705
§ 371 (c)(1),
(2) Date: Oct. 8, 2019

(87) PCT Pub. No.: WO2019/131366
PCT Pub. Date: Jul. 4, 2019

(65) Prior Publication Data
US 2021/0084913 A1 Mar. 25, 2021

(30) Foreign Application Priority Data
Dec. 25, 2017 (JP) .............................. JP2017-247371

(51) Int. Cl.
*A22C 17/00* (2006.01)
*A22C 21/00* (2006.01)
(Continued)

(52) U.S. Cl.
CPC ...... *A22C 17/0006* (2013.01); *A22C 21/0076* (2013.01); *B26D 1/147* (2013.01); *B26D 7/2635* (2013.01); *B26D 2210/02* (2013.01)

(58) Field of Classification Search
CPC . A22C 17/00; A22C 17/0006; A22C 21/0076; B26D 1/147; B26D 7/2635; B26D 2210/02
(Continued)

(56) References Cited

U.S. PATENT DOCUMENTS 4,811,457 A * 3/1989 Lindert .................. A22C 17/02
452/136
5,080,631 A 1/1992 Howard
(Continued)

FOREIGN PATENT DOCUMENTS

EP 2277382 A1 1/2011
JP H05184281 A 7/1993
(Continued)

OTHER PUBLICATIONS

International Search Report issued in Intl. Appln. No PCT/JP2018/046705 dated Mar. 5, 2019 English translation provided.
Written Opinion issued in Intl. Appln. No. PCT/JP2018/046705 dated Mar. 5, 2019.

*Primary Examiner* — Richard T Price, Jr.
(74) *Attorney, Agent, or Firm* — Rossi, Kimms & McDowell LLP

(57) ABSTRACT

A cartilage cutting device for a bone-in meat according to an embodiment includes a cutting blade disposed on a conveying path for a bone-in meat and an elastic support portion for elastically supporting the cutting blade so that the cutting blade can recede by a reaction force applied to the cutting blade when cutting the bone-in meat. The elastic support portion is configured such that an elastic supporting force of the elastic support portion is switchable between a first
(Continued)

elastic supporting force and a second elastic supporting force. The first elastic supporting force is capable of cutting a cartilage adhering to a bone part of the bone-in meat. The second elastic supporting force is smaller than the first elastic supporting force and is incapable of cutting the cartilage.

10 Claims, 4 Drawing Sheets

(51) Int. Cl.
    *B26D 1/147*     (2006.01)
    *B26D 7/26*     (2006.01)

(58) Field of Classification Search
    USPC .......................................................... 452/136
    See application file for complete search history.

(56) References Cited

U.S. PATENT DOCUMENTS

| | | | | |
|---|---|---|---|---|
| 5,401,210 | A | * | 3/1995 | Manmoto .......... A22C 21/0076 452/136 |
| 5,713,787 | A | * | 2/1998 | Schoenmakers ..... A22C 17/004 452/136 |
| 9,033,773 | B2 | | 5/2015 | Taniguchi |
| 9,572,355 | B2 | | 2/2017 | Stooker |
| 2012/0231715 | A1 | | 9/2012 | Kodama |

FOREIGN PATENT DOCUMENTS

| | | |
|---|---|---|
| JP | 2013507101 A | 3/2013 |
| JP | 2013255471 A | 12/2013 |
| WO | 2009139031 A1 | 11/2009 |
| WO | 2012102609 A1 | 8/2012 |
| WO | 2013136996 A1 | 9/2013 |

* cited by examiner

CARTILAGE CUTTING DEVICE AND CARTILAGE CUTTING METHOD FOR BONE-IN MEAT

TECHNICAL FIELD

The present disclosure relates to a cartilage cutting device and a cartilage cutting method for a bone-in meat.

BACKGROUND

In order to save labor, a process of dismantling an edible chicken carcass undergoes transition from manual processing to automatic processing using a machine.

Patent Document 1 discloses an automatic deboner which performs a process of deboning bone-in thigh meats. The deboner intermittently conveys each bone-in thigh meat among a plurality of processing stations while suspending it with a clamping device, and sequentially performs steps of forming incision on the bone-in thigh meat, performing bone-meat separation, and the like in the corresponding stations. Thus, automatic deboning can be performed.

Patent Document 2 discloses a clamping device which holds a bone-in thigh meat conveyed by a conveyor with a multi-axes articulated arm and suspends it to a hanger.

CITATION LIST

Patent Literature

Patent Document 1: JP2013-507101A
Patent Document 2: WO2009/139031A

SUMMARY

Technical Problem

A bone-in thigh meat includes a knee joint part at the center in a direction of a bone part and a cartilage adhering to the knee joint part. When dismantling the bone-in thigh meat, it is necessary to select, according to customer needs, whether to make a cartilage adhere to a boneless meat or whether to make the cartilage adhere to a bone part and not mix with the boneless meat.

Conventionally, a consideration is not given to a measure which can efficiently switch whether to cut off the cartilage adhering to the bone-in thigh meat from the bone part with the meat part or to leave the cartilage with the bone part without manpower during a dismantling processing step of the bone-in thigh meat. Neither Patent Document 1 nor Patent Document 2 discloses a measure to implement such switching.

An object of an embodiment is to efficiently switch whether to leave the cartilage adhering to the bone-in meat with the bone part or to cut off the cartilage from the bone part with the meat part without manpower.

Solution to Problem (1) A cartilage cutting device for a bone-in meat according to an embodiment includes a cutting blade disposed on a conveying path for a bone-in meat and an elastic support portion for elastically supporting the cutting blade so that the cutting blade can recede by a reaction force applied to the cutting blade when cutting the bone-in meat. The elastic support portion is configured such that an elastic supporting force of the elastic support portion is switchable between a first elastic supporting force and a second elastic supporting force, the first elastic supporting force being capable of cutting a cartilage adhering to a bone part of the bone-in meat, the second elastic supporting force being smaller than the first elastic supporting force and being incapable of cutting the cartilage.

With the above configuration (1), it is possible to select cutting the cartilage from the bone part by elastically supporting the above-described cutting blade with the elastic support portion, and making an elastic force of the elastic support portion switchable between the above-described first elastic supporting force and the above-described second elastic supporting force. Thus, it is possible to efficiently switch whether to leave the cartilage with the bone part or to cut off the cartilage from the bone part with the meat part without manpower only by conveying the bone-in meat along the conveying path for the bone-in meat.

(2) In an embodiment, in the above configuration (1), the cutting blade is configured to be able to adjust a position in a direction orthogonal to the conveying path to a normal position.

With the above configuration (2), since the above-described cutting blade is configured to be able to adjust the position in the direction orthogonal to the conveying path to the normal position, the cutting blade is easily adjusted to a position where the cartilage is cut and a position where the cartilage is not cut.

(3) In an embodiment, in the above configuration (1) or (2), the cutting blade includes a pair of cutting blades arranged so as to sandwich the conveying path for the bone-in meat from both sides.

With the above configuration (3), since the pair of cutting blades cut the bone-in meat so as to sandwich the bone-in meat from the both sides, it is possible to extend a circumferential cutting area of the bone part. Thus, it is possible to completely cut the cartilage adhering around the bone part when cutting off the cartilage from the bone part.

(4) In an embodiment, in the above configuration (3), the pair of cutting blades are configured to be able to adjust positions in a direction orthogonal to the conveying path to normal positions, and to adjust a mutual interval thereof.

With the above configuration (4), since the pair of cutting blades are configured to be able to adjust a mutual initial interval thereof, and to adjust the mutual interval thereof, the cutting blades are each easily adjusted to a position where the cartilage is cut and a position where the cartilage is not cut.

(5) In an embodiment, in the above configuration (3) or (4), the pair of cutting blades are constituted by a pair of circular blades arranged along a horizontal direction and rotatable about central axes respectively, and the pair of circular blades are arranged such that blade edge parts overlap in a planar view.

With the above configuration (5), since the cutting area can be set long in a circumferential direction of the bone part, it is possible to completely cut the cartilage adhering around the bone part when cutting off the cartilage from the bone part.

(6) In an embodiment, in any one of the above configurations (1) to (5), the elastic support portion includes an air cylinder elastically supporting the cutting blade, a pressurized-air supply channel for supplying pressurized-air to the air cylinder, and a pressurized-air regulating portion for regulating a pressure of the pressurized-air so as to switch the elastic supporting force of the elastic support portion between the first elastic supporting force and the second elastic supporting force.

With the above configuration (6), since the elastic support portion includes the air cylinder, an air supply channel, and the like, it is possible to make the elastic support portion simple and less expensive.

(7) In an embodiment, in the above configuration (6), the pressurized-air regulating portion includes a three-way valve disposed on the pressurized-air supply channel, a first supply branch channel and a second supply branch channel switchably connected to the pressurized-air supply channel via the three-way valve, a first pressure regulation valve disposed on the first supply branch channel, and a second pressure regulation valve disposed on the second supply branch channel With the above configuration (7), it is possible to make the pressurized-air regulating portion simple and less expensive by constituting the pressurized-air regulating portion with the three-way valve, the first supply branch channel, the second supply branch channel, and the like.

(8) A cartilage cutting method for a bone-in meat according to an embodiment with a cutting device selectively cutting a cartilage adhering to a bone part of a bone-in meat, the cutting device including a cutting blade disposed on a conveying path for the bone-in meat, and an elastic support portion for elastically supporting the cutting blade includes a cutting step of conveying the bone-in meat to the cutting blade and cutting the cartilage with the cutting blade, and a selection step of adjusting, in the cutting step, an elastic supporting force of the elastic support portion to a first elastic supporting force or a second elastic supporting force, the first elastic supporting force being capable of cutting the cartilage, the second elastic supporting force being smaller than the first elastic supporting force and being incapable of cutting the cartilage.

With the above method (8), in the above-described selection step, it is possible to select cutting the cartilage from the bone part by elastically supporting the above-described cutting blade with the elastic support portion, and making an elastic force of the elastic support portion switchable between the above-described first elastic supporting force and the above-described second elastic supporting force. Thus, it is possible to efficiently switch whether to leave the cartilage with the bone part or to cut off the cartilage from the bone part with the meat part without manpower in a process of conveying the bone-in meat along the conveying path for the bone-in meat.

(9) In an embodiment, in the above method (8), the cutting blade includes a pair of cutting blades arranged so as to sandwich the conveying path for the bone-in meat from both sides, and before the cutting step, the method further includes a positioning step of adjusting positions of the pair of cutting blades in a direction orthogonal to the conveying path to normal positions and adjusting a mutual interval thereof.

With the above method (9), since the pair of cutting blades can adjust a mutual initial interval thereof, the cutting blades are each easily adjusted to a position where the cartilage is cut and a position where the cartilage is not cut.

(10) In an embodiment, in the above method (9), the bone-in meat is a bone-in thigh meat, and the cutting step includes conveying the bone-in thigh meat such that a knee part thereof is oriented toward an upstream side or a downstream side in a conveying direction, and an inner thigh surface and an outer thigh surface thereof respectively face the pair of cutting blades.

With the above method (10), since the bone-in thigh meat is conveyed such that the inner thigh surface and the outer thigh surface thereof respectively face the pair of cutting blades, it is possible to completely cut the cartilage adhering directly below to a knee joint part thereof inside the knee part.

Advantageous Effects

According to an embodiment, it is possible to efficiently switch whether to leave a cartilage adhering to a bone-in meat with a bone part or to cut off the cartilage from the bone part with a meat part without manpower.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain", and "constitute" are not intended to be exclusive of other components.

Figure 1:
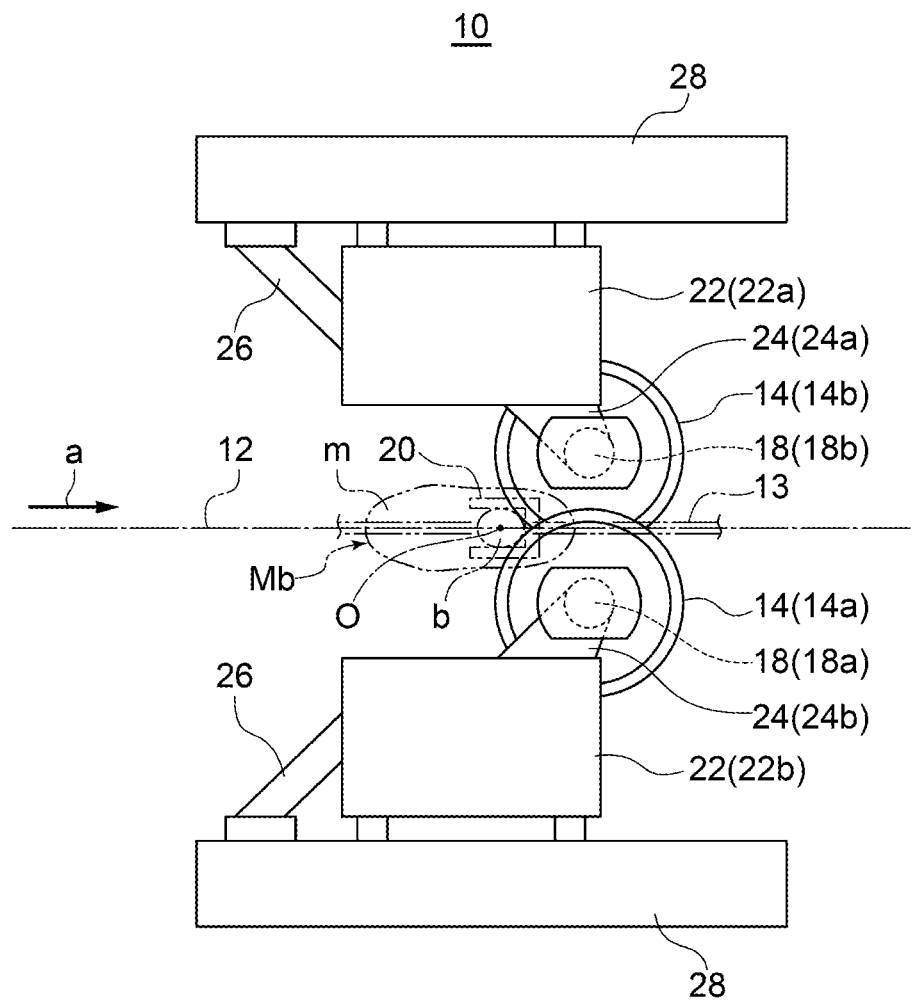
FIG. 1 is a planar view of a cartilage cutting device for a bone-in meat according to an embodiment.
Figure 2:
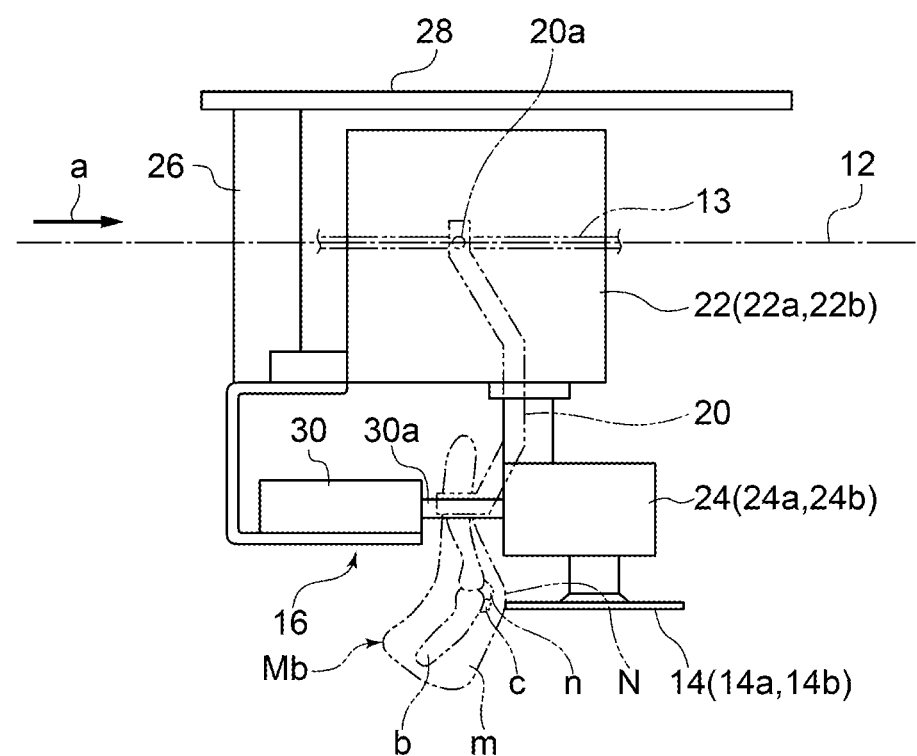
FIG. 2 is a front view of the cartilage cutting device for a bone-in meat according to an embodiment.

FIGS. 1 and 2 each show a cartilage cutting device 10 for a bone-in meat according to an embodiment.

In FIGS. 1 and 2, the cartilage cutting device 10 includes a cutting blade 14 disposed on a conveying path 12 for a bone-in meat Mb. The cutting blade 14 is elastically supported by an elastic support portion 16 and can recede by a reaction force applied to the cutting blade 14 from the bone-in meat Mb when cutting the bone-in meat Mb.

An elastic supporting force of the elastic support portion 16 elastically supporting the cutting blade 14 is configured to be switchable between the first elastic supporting force and the second elastic supporting force. The first elastic supporting force is capable of cutting a cartilage c adhering to a bone part b of the bone-in meat Mb. The second elastic supporting force is smaller than the first elastic supporting force and is incapable of cutting the cartilage c.

According to the above configuration, it is possible to select whether or not to cut the cartilage c from the bone part b by making an elastic force of the elastic support portion 16 elastically supporting the cutting blade 14 switchable between the first elastic supporting force and the second elastic supporting force. Thus, it is possible to efficiently switch whether to leave the cartilage c with the bone part b or to cut off the cartilage c from the bone part b with a meat part m without manpower only by conveying the bone-in meat Mb along the conveying path 12.

In an embodiment, the cutting blade 14 is configured to be able to adjust a position in a direction orthogonal to the conveying path 12 to a normal position.

According to the present embodiment, since the cutting blade 14 is configured to be able to adjust the position in the direction orthogonal to the conveying path 12 to the normal position, the cutting blade 14 is easily adjusted to a position where the cartilage c is cut and a position where the cartilage c is not cut.

In an embodiment, as shown in FIG. 1, the cutting blade 14 includes a pair of cutting blades 14 (14a and 14b) arranged so as to sandwich the conveying path 12 from both sides.

According to the present embodiment, since the bone-in meat Mb is cut to be sandwiched from the both sides by the pair of cutting blades 14, it is possible to extend a circumferential cutting area of the bone part b. Thus, it is possible to completely cut the cartilage c adhering around the bone part b when cutting off the cartilage c from the bone part b.

In an embodiment, the pair of cutting blades 14 (14a and 14b) are each configured to be able to adjust the position in the direction orthogonal to the conveying path 12 to the normal position. For example, as a way to adjust the position, it is possible to adjust the position by pushing one of the pair of cutting blades 14 in the direction orthogonal to the conveying path 12 using a push bolt.

According to the present embodiment, the pair of cutting blades 14 can adjust a mutual initial interval thereof, facilitating the selection of switching of whether or not to cut the cartilage c from the bone part b.

In an embodiment, the bone-in meat Mb is suspended by a clamping unit 20 and conveyed along the conveying path 12 with the clamping unit 20.

In an embodiment, as shown in FIG. 2, the clamping unit 20 is mounted to a conveying unit 13 such as a chain disposed on the conveying path 12 and moves in the direction of an arrow "a" with the conveying unit 13. The clamping unit 20 is connected to the conveying unit 13 by a connection 20a and moves in the direction of the arrow "a".

In an embodiment, as shown in FIG. 1, a gravity center O when the clamping unit 20 suspends the bone-in meat Mb is positioned directly below the connection 20a. Thus, it is possible to suppress the oscillation of the clamping unit 20.

In an embodiment, as shown in FIG. 1, the pair of cutting blades 14 are constituted by a pair of circular blades arranged along a horizontal direction and rotatable about central rotational shafts 18 (18a and 18b) respectively. In addition, the pair of circular blades are arranged such that blade edge parts overlap in a planar view.

According to the present embodiment, since the cutting area can be set long in a circumferential direction of the bone part b, it is possible to completely cut the cartilage c adhering around the bone part b when cutting off the cartilage c from the bone part b.

In an embodiment, the pair of cutting blades 14 (14a and 14b) are respectively driven by driving portions 22 (22a and 22b). The driving portions 22 are fixed to support frames 28 via connection frames 26. Driving forces of the driving portions 22 are transmitted to the rotational shafts 18 (18a and 18b) via power transmitting portions 24 (24a and 24b). The cutting blades 14 (14a and 14b) rotate integrally with the rotational shafts 18 (18a and 18b).

When the pair of cutting blades 14 (14a and 14b) are constituted by the rotatable pair of circular blades, the driving portions 22 are constituted by, for example, motors.

Figure 3:
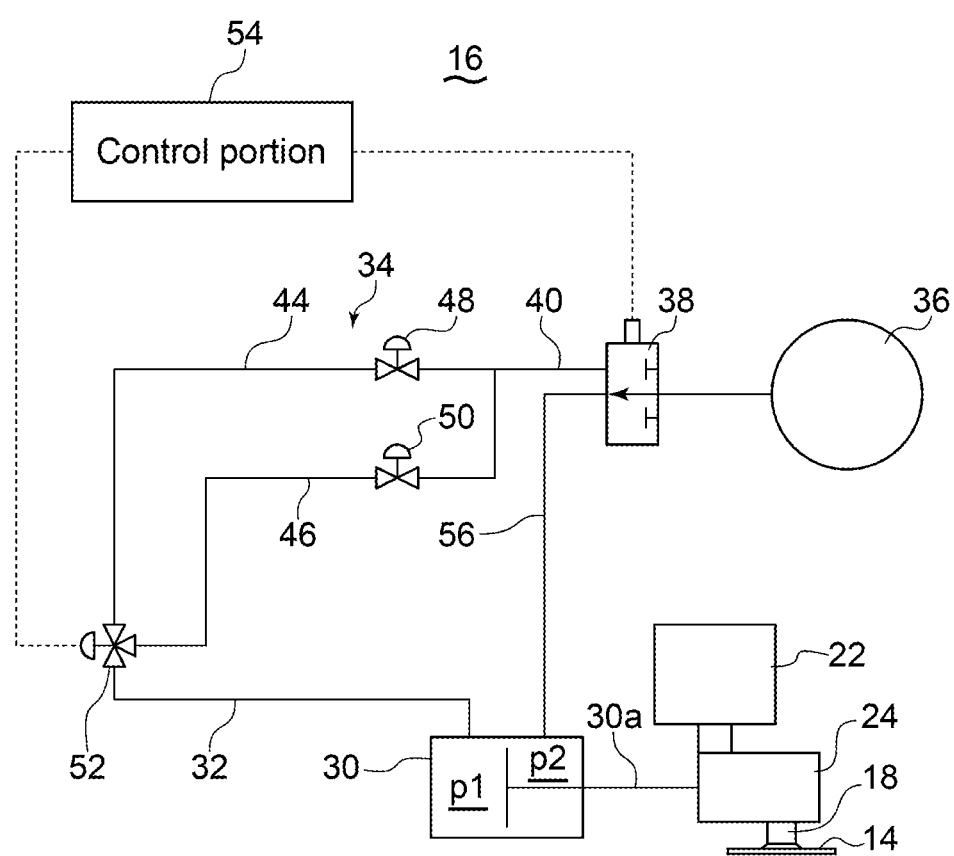
FIG. 3 is a system diagram of a control portion of the cartilage cutting device according to an embodiment.

In an embodiment, as shown in FIG. 3, the elastic support portion 16 includes an air cylinder 30 elastically supporting the cutting blades 14. The air cylinder 30 receives pressurized air from a pressurized-air supply channel 32. A pressure of the pressurized air is regulated by a pressurized-air regulating portion 34 such that the elastic supporting force of the elastic support portion 16 elastically supporting the cutting blades 14 can be switched between the first elastic supporting force and the second elastic supporting force.

According to the present embodiment, it is possible to make the configuration of the elastic support portion 16 simple and less expensive by constituting the elastic support portion 16 with the air cylinder, an air supply channel, and the like.

In an embodiment, a piston rod 30a of the air cylinder 30 is connected to the power transmitting portion 24 transmitting the power to the cutting blades 14 and elastically supports the power transmitting portion 24.

In an embodiment, as shown in FIG. 3, the pressurized-air regulating portion 34 includes a three-way valve 52 disposed on the pressurized-air supply channel 32, and a first supply branch channel 44 and the second supply branch channel 46 switchably connected to the pressurized-air supply channel 32 via the three-way valve 52. The first supply branch channel 44 includes a first pressure regulation valve 48. The second supply branch channel 46 includes a second pressure regulation valve 50.

It is possible to regulate the pressure of the pressurized air supplied to the air cylinder 30 by regulating the pressure of the pressurized air of the first supply branch channel 44 and the second supply branch channel 46 with the first pressure regulation valve 48 and the second pressure regulation valve 50. Thus, the air cylinder 30 can switchably support the cutting blades 14 with the first elastic supporting force and the second elastic supporting force.

According to the present embodiment, it is possible to make the pressurized-air regulating portion 34 simple and less expensive by constituting the pressurized-air regulating portion 34 with the three-way valve 52, the first supply branch channel 44, the second supply branch channel 46, and the like.

In an embodiment, as shown in FIG. 3, the first supply branch channel 44 and the second supply branch channel 46 merge into a pressurized-air supply channel 40 on an upstream side. The pressurized-air supply channel 40 communicates with a pressurized-air supply source 36 via a switch valve 38. The pressurized-air supply channel 32 communicates with an air chamber p1 of the air cylinder 30. The first pressure regulation valve 48 is adjusted such that the first elastic supporting force which is capable of cutting the cartilage c can be applied to the cutting blades 14 by supplying the pressurized air flowing through the first supply branch channel 44 to the air chamber p1 of the air cylinder 30. The second pressure regulation valve 50 is adjusted such that the second elastic supporting force which is smaller than the first elastic supporting force and is incapable of cutting the cartilage c can be applied to the cutting blades 14 by supplying the pressurized air flowing through the second supply branch channel 46 to the air chamber p1 of the air cylinder 30.

A control portion 54 controls the three-way valve 52 to bring the first supply branch channel 44 and the pressurized-air supply channel 32 into communication when the cartilage c is cut. The control portion 54 controls the three-way valve 52 to bring the second supply branch channel 46 and the pressurized-air supply channel 32 into communication when the cartilage c is not cut.

In an embodiment, as shown in FIG. 3, a pressurized-air supply channel 56 is connected to the other air chamber p2 of the air cylinder 30. The pressurized-air supply channel 56 is connected to the pressurized-air supply source 36 via the switch valve 38.

According to the present embodiment, it is possible to release an elastic force applied to each of the cutting blades 14 by causing the control portion 54 to switch the switch valve 38 to bring the pressurized-air supply source 36 and the pressurized-air supply channel 56 into communication. Thus, it is possible to allow the bone-in meat Mb to pass without undergoing a cutting process by the cartilage cutting device 10.

In an embodiment, the position of the clamping unit 20 moving through the conveying path 12 is detected by an encoder (not shown), and a value obtained by the detection is input to the control portion 54. The control portion 54 switches the switch valve 38 in accordance with the position of the clamping unit 20 and selectively supplies the pressurized air to the air chamber p1 or p2.

According to the present embodiment, it is possible to automatically select, by the control portion 54, whether or not to cut the cartilage c when each of a plurality of bone-in meats Mb is suspended by a corresponding one of a plurality of clamping units 20 and conveyed to the cartilage cutting device 10.

A cartilage cutting method for a bone-in meat according to an embodiment is a method with the cartilage cutting device 10 selectively cutting the cartilage c adhering to the bone part b of the bone-in meat Mb. The cartilage cutting device 10 includes the cutting blades 14 disposed on the conveying path 12 for the bone-in meat Mb and the elastic support portion 16 for elastically supporting the cutting blades 14.

Figure 4:
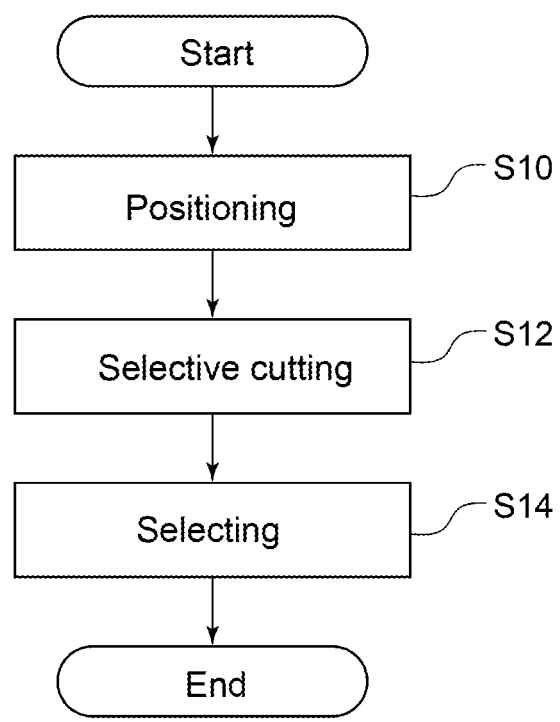
FIG. 4 is a flowchart of a cartilage cutting method for a bone-in meat according to an embodiment.

First, as shown in FIG. 4, the position of each of the cutting blades 14 in the direction orthogonal to the conveying path 12 is adjusted to the corresponding normal position (positioning step S10). Consequently, the cutting blades 14 are each easily adjusted to the position where the cartilage c is cut and the position where the cartilage c is not cut.

Following the positioning step S10, the bone-in meat Mb is conveyed to the cutting blades 14 along the conveying path 12, and the cutting blades 14 selectively cut the cartilage c (cutting step S12). In the cutting step S12, the elastic supporting force of the elastic support portion 16 is adjusted to the first elastic supporting force which is capable of cutting the cartilage c or the second elastic supporting force which is smaller than the first elastic supporting force and is incapable of cutting the cartilage c (selection step S14).

According to the above method, in the selection step S14, it is possible to select whether or not to cut the cartilage c from the bone part b or whether to leave the cartilage c with the bone part b by elastically supporting the cutting blades 14 with the elastic support portion 16, and making the elastic force of the elastic support portion 16 switchable between the first elastic supporting force and the second elastic supporting force. Thus, it is possible to efficiently switch whether to leave the cartilage c with the bone part b or to cut off the cartilage c from the bone part b with the meat part m without manpower in a process of conveying the bone-in meat Mb along the conveying path 12 for the bone-in meat Mb.

In an embodiment, as shown in FIG. 1, the cutting blades 14 include the pair of cutting blades 14 (14a and 14b) arranged so as to sandwich the conveying path 12 for the bone-in meat Mb from both sides. In the positioning step S10, the position of each of the pair of cutting blades 14 in the direction orthogonal to the conveying path 12 is adjusted to the corresponding normal position, and the mutual interval thereof is adjusted.

Consequently, the pair of cutting blades are each easily adjusted to the position where the cartilage c is cut and the position where the cartilage c is not cut.

In an embodiment, the bone-in meat Mb is a bone-in thigh meat and in the cutting step S12, as shown in FIG. 2, the bone-in thigh meat is conveyed such that a knee part N thereof is oriented toward an upstream side or a downstream side in a conveying direction, and an inner thigh surface and an outer thigh surface thereof respectively face the pair of cutting blades 14.

According to the present embodiment, since the bone-in thigh meat is conveyed such that the inner thigh surface and the outer thigh surface thereof respectively face the pair of cutting blades 14, it is possible to completely cut the cartilage c adhering directly below to a knee joint part n thereof inside the knee part N.

In an embodiment, it is possible to apply a bone-in limb meat as the bone-in meat Mb. The "bone-in limb meat" includes front limbs and back limbs of a poultry carcass and a livestock carcass. The above-described bone-in thigh meat is an example of the bone-in limb meat.

INDUSTRIAL APPLICABILITY

According to an embodiment, it is possible to efficiently switch whether to leave a cartilage adhering to a bone-in meat with a bone part or to cut off the cartilage from the bone part with a meat part without manpower.

REFERENCE SIGNS LIST

10 Cartilage cutting device for bone-in meat
12 Conveying path
13 Conveying unit
14 (14a, 14b) Cutting blade
16 Elastic support portion
18 (18a, 18b) Rotational shaft
20 Clamping unit
20a Connection
22 Driving portion
24 (24a, 24b) Power transmitting portion
26 Connection frame
28 Support frame
30 Air cylinder
30a Piston rod
32, 40, 56 Pressurized-air supply channel
34 Pressurized-air regulating portion
36 Pressurized-air supply source
38 Switch valve
44 First supply branch channel
46 Second supply branch channel
48 First pressure regulation valve 50 Second pressure regulation valve
52 Three-way valve
54 Control portion
Mb Bone-in meat
N Knee part
O Gravity center
b Bone part
c Cartilage
m Meat part
n Knee joint part
p1, p2 Air chamber

The invention claimed is:

1. A cartilage cutting device for a bone-in meat, comprising:
 a cutting blade disposed on a conveying path for a bone-in meat; and
 an elastic support portion for elastically supporting the cutting blade so that the cutting blade can recede by a reaction force applied to the cutting blade when cutting the bone-in meat,
 wherein the elastic support portion is configured such that an elastic supporting force of the elastic support portion is switchable between a first elastic supporting force and a second elastic supporting force, the first elastic supporting force being capable of cutting a cartilage adhering to a bone part of the bone-in meat, the second elastic supporting force being smaller than the first elastic supporting force and being incapable of cutting the cartilage.

2. The cartilage cutting device for a bone-in meat according to claim 1,
 wherein the cutting blade is configured to be able to adjust a position in a direction orthogonal to the conveying path to a normal position.

3. The cartilage cutting device for a bone-in meat according to claim 1,
 wherein the cutting blade includes a pair of cutting blades arranged so as to sandwich the conveying path for the bone-in meat from both sides.

4. The cartilage cutting device for a bone-in meat according to claim 3,
 wherein the pair of cutting blades are configured to be able to adjust positions in a direction orthogonal to the conveying path to normal positions, and to adjust a mutual interval thereof.

5. The cartilage cutting device for a bone-in meat according to claim 3,
 wherein the pair of cutting blades are constituted by a pair of circular blades arranged along a horizontal direction and rotatable about central axes respectively, and
 wherein the pair of circular blades are arranged such that blade edge parts overlap in a planar view.

6. The cartilage cutting device for a bone-in meat according to claim 1,
 wherein the elastic support portion includes:
 an air cylinder elastically supporting the cutting blade;
 a pressurized-air supply channel for supplying pressurized-air to the air cylinder; and
 a pressurized-air regulating portion for regulating a pressure of the pressurized air so as to switch the elastic supporting force of the elastic support portion between the first elastic supporting force and the second elastic supporting force.

7. The cartilage cutting device for a bone-in meat according to claim 6,
 wherein the pressurized-air regulating portion includes:
 a three-way valve disposed on the pressurized-air supply channel;
 a first supply branch channel and a second supply branch channel switchably connected to the pressurized-air supply channel via the three-way valve;
 a first pressure regulation valve disposed on the first supply branch channel; and
 a second pressure regulation valve disposed on the second supply branch channel.

8. A cartilage cutting method for a bone-in meat with a cutting device selectively cutting a cartilage adhering to a bone part of a bone-in meat, the cutting device including:
 a cutting blade disposed on a conveying path for the bone-in meat; and
 an elastic support portion for elastically supporting the cutting blade,
 the method comprising:
 a cutting step of conveying the bone-in meat to the cutting blade and selectively cutting the cartilage with the cutting blade; and
 a selection step of adjusting, in the cutting step, an elastic supporting force of the elastic support portion to a first elastic supporting force or a second elastic supporting force, the first elastic supporting force being capable of cutting the cartilage, the second elastic supporting force being smaller than the first elastic supporting force and being incapable of cutting the cartilage.

9. The cartilage cutting method for a bone-in meat according to claim 8,
 wherein the cutting blade includes a pair of cutting blades arranged so as to sandwich the conveying path for the bone-in meat from both sides, and
 wherein, before the cutting step, the method further comprises a positioning step of adjusting positions of the pair of cutting blades in a direction orthogonal to the conveying path to normal positions and adjusting a mutual interval thereof.

10. The cartilage cutting method for a bone-in meat according to claim 9,
 wherein the bone-in meat is a bone-in thigh meat, and
 wherein the cutting step includes conveying the bone-in thigh meat such that a knee part thereof is oriented toward an upstream side or a downstream side in a conveying direction, and an inner thigh surface and an outer thigh surface thereof respectively face the pair of cutting blades.

* * * * *